United States Patent [19]
Dollar, II et al.

[11] Patent Number: 5,706,159
[45] Date of Patent: Jan. 6, 1998

[54] CIRCUIT INTERRUPTER INCLUDING AN ELECTRIC ARC MONITORING CIRCUIT

[75] Inventors: Charles Randall Dollar, II, Norcross; Woothi Strickland, Decatur, both of Ga.

[73] Assignee: Siemens Energy & Automation, Inc., Alpharetta, Ga.

[21] Appl. No.: 455,771

[22] Filed: May 31, 1995

Related U.S. Application Data

[63] Continuation-in-part of Ser. No. 413,304, Mar. 30, 1995, Pat. No. 5,590,012.

[51] Int. Cl.$^6$ .................................................. H02H 3/46
[52] U.S. Cl. ........................... 361/113; 361/110; 361/85; 324/536
[58] Field of Search .................................. 361/113, 110, 361/85; 324/536

[56] References Cited

U.S. PATENT DOCUMENTS

| | | |
|---|---|---|
| H536 | 10/1988 | Strickland et al. |
| Re. 30,678 | 7/1981 | Van Zeeland et al. |
| 2,637,020 | 4/1953 | Stegall. |
| 2,808,566 | 10/1957 | Douma. |
| 3,471,784 | 10/1969 | Arndt et al. |
| 3,588,611 | 6/1971 | Lambden et al. |
| 3,622,872 | 11/1971 | Boaz. |
| 3,746,930 | 7/1973 | Van Best et al. |
| 3,775,675 | 11/1973 | Freeze et al. |
| 3,855,443 | 12/1974 | Bell, Jr. et al. |
| 3,869,665 | 3/1975 | Kenmochi et al. |
| 3,878,460 | 4/1975 | Nimmersjo. |
| 3,911,323 | 10/1975 | Wilson et al. |
| 3,914,667 | 10/1975 | Waldron. |
| 4,047,235 | 9/1977 | Davis ................ 361/100 |
| 4,115,828 | 9/1978 | Rowe et al. ........... 361/1 |
| 4,169,260 | 9/1979 | Bayer ................ 340/562 |
| 4,214,210 | 7/1980 | O'Shea ............... 455/282 |

(List continued on next page.)

FOREIGN PATENT DOCUMENTS

| | | |
|---|---|---|
| 0166815 | 1/1986 | European Pat. Off. |
| 0 318 274 | 5/1989 | European Pat. Off. |
| 1 020 410 | 12/1957 | Germany. |
| 2 430 294 | 1/1976 | Germany. |
| 2 235 342 | 2/1991 | United Kingdom. |
| 8607160 | 12/1986 | WIPO. |
| 9004278 | 4/1990 | WIPO. |
| 92 08143 | 5/1992 | WIPO. |
| 94 22031 | 9/1994 | WIPO. |

OTHER PUBLICATIONS

"Detection of Arcing . . . " Electric Power Research Inst. EPRI EL-2757, Dec. 1982.
"Directional Coupler . . . " Alejandro Duenas J., RF Design, Feb. 1986, pp. 62–64.
"Directional Couplers" Antonio Paolantonio, RF Design, Sep./Oct. '79, 40–49.
Two-page European Search Report (No. EP 93 90 0672) dated Jul. 9, 1995.
International Search Report for PCT/US96/02545 (Jul. 1996).
International Search Report for PCT/US96/02546 (Aug. 1996).

*Primary Examiner*—Todd DeBoer

[57] ABSTRACT

A circuit interrupter including an improved arc detection system which trips the interrupter in response to currents having frequencies and/or characteristics associated with arcing within the associated alternating current electrical system. The arc monitoring circuit determines if the signal produced by a current transducer is the result of arcing. The arc detection system includes two swept filters and associated amplifiers which produce a signal which has an amplitude representative of the frequencies present in the alternating current of the electric system. The portion of the filtered signal which has amplitudes above a predetermined level is integrated to produce a trip signal for the circuit interrupter when the value of the integration exceeds a predetermined limit.

55 Claims, 8 Drawing Sheets

U.S. PATENT DOCUMENTS

| | | | |
|---|---|---|---|
| 4,245,187 | 1/1981 | Wagner et al. | 324/54 |
| 4,316,187 | 2/1982 | Spencer | 340/664 |
| 4,376,243 | 3/1983 | Renn et al. | 219/514 |
| 4,387,336 | 6/1983 | Joy et al. | 324/51 |
| 4,402,030 | 8/1983 | Moser et al. | 361/93 |
| 4,466,071 | 8/1984 | Russell, Jr. | 364/492 |
| 4,639,817 | 1/1987 | Cooper et al. | 361/62 |
| 4,644,439 | 2/1987 | Taarning | 361/87 |
| 4,658,322 | 4/1987 | Rivera | 361/37 |
| 4,670,812 | 6/1987 | Doerfler et al. | 361/83 |
| 4,697,218 | 9/1987 | Nicolas | 361/87 |
| 4,771,355 | 9/1988 | Emery et al. | 361/33 |
| 4,810,954 | 3/1989 | Fam | 324/142 |
| 4,853,818 | 8/1989 | Emery et al. | 361/33 |
| 4,858,054 | 8/1989 | Franklin | 361/57 |
| 4,922,368 | 5/1990 | Johns | 361/62 |
| 4,931,894 | 6/1990 | Legatti | 361/45 |
| 4,949,214 | 8/1990 | Spencer | 361/95 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,280,404 | 1/1994 | Ragsdale | 361/113 |
| 5,359,293 | 10/1994 | Boksiner et al. | 324/544 |
| 5,432,455 | 7/1995 | Blades | 324/536 |
| 5,434,509 | 7/1995 | Blades | 324/536 |

CIRCUIT INTERRUPTER INCLUDING AN ELECTRIC ARC MONITORING CIRCUIT

CROSS-REFERENCE TO RELATED APPLICATIONS

The present patent application is a continuation-in-part of U.S. patent application Ser. No. 08/413,304, which has now issued as U.S. Pat. No. 5,590,012 filed on Mar. 30, 1995 entitled Electric Arc Detector Sensor Circuit.

FIELD OF THE INVENTION

The present invention relates to monitoring, detecting, analyzing and responding to electric currents on a conductor at frequencies (secondary frequencies) different from the frequency (primary frequency) of the current for which the conductor is intended to conduct (i.e. 60 Hz current conducted within the electrical wiring of a building). In particular, the present invention relates to circuit arrangements for detecting the current and/or voltage of secondary frequencies representative of electric arcs.

BACKGROUND OF THE INVENTION

Various arc detection systems have been used in an attempt to detect arcing in the wiring of both residential and commercial buildings. It is recognized that arcs occurring between line and neutral or ground conductors and series arcing can produce temperatures well above the ignition level of many common flammable materials, and therefore pose a significant fire hazard. For example, wiring with degraded or aged insulation and worn power cords in a home may arc sufficiently to start a fire.

Two basic types of arcing which are likely to occur in buildings are line fault arcing and contact arcing. An arc due to a line fault results from either a line-to-line short, a line-to-neutral or a line-to-ground short. When a fault of this type occurs, the fault will draw current up to or beyond the capacity of the circuit, lights will dim indicating an excessive load is being drawn, and, if the associated circuit is protected by a circuit breaker, the circuit breaker will trip, interrupting the supply of power to the arc. Typically, these events will occurs in less than a second, and the arcing will have a duration insufficient to radiate or conduct substantial heat energy to the surrounding materials. Thus, the likelihood of fire is relatively low.

Contact arcing is commonly caused by use of worn electrical outlets, plugs and switches. As a result of such wear, these devices have insufficient current-carrying capacity for their originally intended purposes. For example, a plug may be subjected to a substantial number of heating cycles caused by resistance heating. This cycling gradually decomposes the insulating material around the contact area until material partially flows into the contact area thereby preventing proper electrical contact from being made at the plug. This process may become regenerative as the initial arcing produces more heat, thus, carbonizing the insulation, producing an insulating layer of the contact surfaces of the plug.

Other common sites of arcing are oxidized terminals, oxidized and worn switch contacts, and the interfaces between aluminum wiring and connection terminals made of dissimilar metals such as copper. The arcing which normally occurs under these circumstances is usually referred to as series arcing.

In view of the potential for arcing in the electrical systems of buildings, and the potential for devastating results thereof (i.e. building fires), a number of systems have been developed to detect arcing in building wiring. For example, U.S. Pat. No. 5,223,795, issued to Frederick K. Blades on Jun. 29, 1993, discloses a method and apparatus for detecting arcing in electrical connections by monitoring high frequency noise. The apparatus monitors high-frequency noise on the associated power line characteristic of arcing. One way the apparatus determines if arcing is present is to discriminate arcing noise from other high-frequency noise by determining if gaps in the noise occur every half-cycle of the power frequency.

Systems such as that disclosed in the '795 patent may operate effectively to detect arcing, but it would be desirable to improve the arc detecting capability of such systems so that the system can discriminate between different types of arcing and provide the ability to produce different responses to different types of arcing. Improvements in the performance can take a number of forms such as refining programming and refining interface circuitry to apply more accurate representations of signals monitored by the system. However, regardless of the quality of the system for monitoring and analyzing signals, the system will only produce arc protecting results as good as the systems ability to produce signals representative of the high frequency currents on the wiring being monitored. For example, current transformers are typically used to produce signals representative of the high frequency currents (desired signals) on the wiring being monitored. However, current transformers may incorporate signals representative of noise radiated onto the wires being monitored. In addition, a current transformer may also sense standing waveforms unrelated to the high frequency currents.

Accordingly, there is a need for improved sensors and circuitry for producing signals representative of the high frequency currents on the wiring being monitored by an arc detection system. In particular, there is a need for an improved sensor for use in the detection of series, line-to-neutral, line-to-ground and contact arcs which reduces or eliminates the sensing of standing waveforms.

SUMMARY OF THE INVENTION

The present invention provides an arc detector for producing an arc signal in response to an arc produced by the current in an electric conductor. The detector includes a transducer or sensor which produces a first signal representative of the current in the electrical conductor, wherein the current has a plurality of frequencies. A transform circuit coupled to the sensor produces a second signal having amplitudes which represent the potential of the current at the plurality of frequencies. The detector also includes a monitoring circuit coupled to the transform circuit to monitor the amplitudes of the second signal corresponding to a predetermined range of the plurality of frequencies, and to generate the arc signal when the amplitudes of the predetermined range correspond to a predetermined amplitude condition.

Another configuration of the detector includes a variable frequency filter circuit having a filter frequency which changes in response to a control signal. The filter is coupled to the transducer to generate a second signal having a plurality of amplitudes representative of the current at a respective plurality of frequencies. A threshold sensing circuit coupled to the variable frequency filter circuit generates the arc signal when a plurality of the amplitudes representative of the currents at the respective plurality of frequencies within a predetermined range exceed at least one threshold amplitude.

A further configuration of the detector includes generating means for generating a first signal representative of an electric arc in an electrical conductor and filtering means for filtering the first signal at a plurality of frequencies to generate a second signal. A monitoring means monitors the second signal to generate a third signal representative of the amplitude of the second signal within a predetermined range of the plurality of frequencies. When the third signal is representative of arcing within the electrical conductor, a detection means generates an arc detection signal.

The present invention also provides a circuit interrupter for interrupting the flow of current within at least one electrical conductor in response to arcing produced by current flow in the electrical conductor. The interrupter includes a switching device which is operable to open the circuit defined by the electrical conductor in response to a trip signal, and a transducer which generates a first signal representative of the electric current in the electrical conductor. A variable frequency filter coupled to the transducer generates a second signal representative of the first signal at a plurality of frequencies within a first range, and a monitoring circuit generates a third signal representative of the power of a predetermined portion of the second signal. The predetermined portion is generated from a predetermined second range of the plurality of frequencies in the first range. The interrupter also includes a trip circuit which applies a trip signal to the switching device when the third signal is representative of an energy level of the predetermined portion of the second signal representative of arcing in the electrical conductor.

Another configuration of the circuit interrupter includes switching means for opening a circuit including an electrical conductor in response to a trip signal, sensing means for generating a first signal representative of electric current in the electrical conductor, and filtering means for generating a second signal representative of the first signal filtered at a plurality of frequencies in a first range. The interrupter further includes monitoring means for generating a third signal representative of the power of a predetermined portion of the second signal. The predetermined portion is generated from a predetermined second range of the plurality of frequencies in the first range. A trip means applies a trip signal to the switching means when the third signal is representative of an energy level of the predetermined portion of the second signal representative of arcing in the electrical conductor.

The present invention further provides an electric arc detection method which includes the steps of generating a first signal representative of an electric current in an electrical conductor, filtering the first signal at a plurality of frequencies to generate a second signal, monitoring the second signal to generate a third signal representative of the power of the second signal within a predetermined range of the plurality of frequencies, and generating an arc detection signal when the third signal is representative of arcing within the electrical conductor.

DETAILED DESCRIPTION OF THE PREFERRED EMBODIMENT

Figure 1:
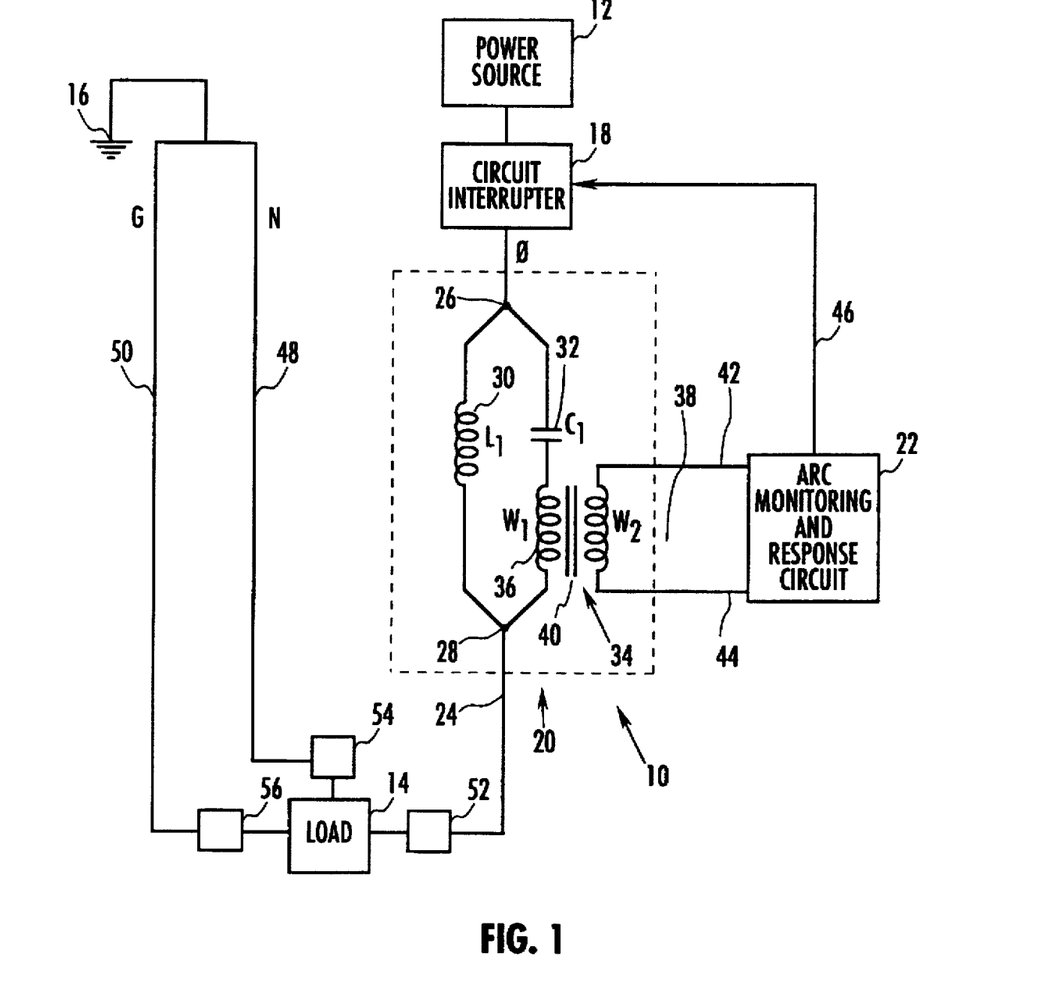
FIG. 1 is a schematic circuit diagram of a first embodiment of an arc detection system.

Referring to FIG. 1, an arc detection system 10 is configured to detect arcing such as line-to-line, line-to-ground, line-to-neutral or contact arcing. Arc detection is based upon monitoring the current in at least one of the conductors of an alternating current electrical circuit such as that schematically illustrated in FIGS. 1 and 2. These circuits, within which arcs are monitored, include an alternating current (AC) voltage power source 12, a load 14, a ground reference 16, and a circuit interrupter 18 (e.g., circuit breaker operable by a trip solenoid).

Arc detection system 10 includes a current sensor 20 and an arc monitoring and response circuit 22. In the present embodiment of system 10, current sensor 20 is connected in series with circuit interrupter 18 between power source 12 and load 14. Current sensor 20 includes a terminal 26, a terminal 28, an inductor 30, a capacitor 32, and a transformer 34. Transformer 34 includes a primary winding 36 ($W_1$) and a secondary winding 38 ($W_2$) which are magnetically coupled by a core 40. Inductor 30 is connected between terminals 26 and 28, and capacitor 32 is connected in series with primary winding 36 between terminals 26 and 28. Accordingly, capacitor 32 and primary winding 36 are connected in parallel between terminals 26 and 28 with inductor 30.

Arc monitoring and response circuit 22 is connected to secondary winding 38 by conductors 42 and 44. Transformer 34 provides isolation between conductor 24 and circuit 22, and also applies signals representative of the current in primary winding 36. Arc monitoring and response circuit 22 may be arranged in accordance with either of the two embodiments discussed in detail below. Circuit 22 operates to produce a trip signal in response to the signal applied thereto on conductors 42 and 44. In general, circuit 22 is powered from phase conductor 24 and analyses the non-primary frequency signals in phase conductor 24 to determine the presence of arcing. The trip signal is appropriately conditioned (e.g., amplified and isolated) by an appropriate control circuit within circuit 22 and then applied to a conductor 46 connected to circuit interrupter 18. Accordingly, when circuit 22 detects an undesirable arc based upon the signal produced by current sensor 20, a trip signal is applied to circuit interrupter 18, which disconnects power from power source 12 from load 14.

By way of example, the preferred embodiment of circuit 20 includes a transformer 34 having a one-to-one turn ratio and a ferrite core 40 for magnetically coupling windings 36 and 34. Furthermore, the impedances of inductor 30 and winding 36 may be chosen to be generally equal and in the range of 0.5 milliohms to 2 ohms at the operating frequency of the electrical circuit. More specifically, the arc detection system described above is typically used in building wiring circuits (i.e., residential or industrial) which are supplied alternating electrical current at 60 Hz. Accordingly, inductor 30 and winding 36 would have an impedance from 0.5 milliohms to 2 ohms at the primary frequency of 60 Hz.

Capacitor 32 operates to filter current at the primary frequency so this current is inhibited from flowing through winding 36. Accordingly, capacitor 32 is selected to have an impedance at 60 Hz which is in the range of $5 \times 10^9$ to $30 \times 10^9$ times as large as the impedance of inductor 30. For example, inductor 30 may have a value of 1.3 microhenries and capacitor 32 may have a value of 220 picofarads. (At 60 $H_2$ capacitor 32 has an impedance about $25 \times 10^9$ times that of inductor 30.) Inductor 30 is capable of carrying the full load current on conductor 24. The impedance of inductor 30 is low at the primary frequency of 60 Hz, but increases as the frequency of the current on conductor 24 increases. Thus, the high frequency components pass through the parallel path including capacitor 32 and winding 36. Capacitor 32 and winding 38 produce a band pass filter with a center frequency which may be in the range of 10 kHz to 1 gigahertz, but is preferably in the range of 5-30 MHz. In general, the center frequency ($f_c$) is defined by the following equation:

$$f_c = [2 * \pi * (\text{Capacitance of capacitor 32} * \text{Inductance of winding 38})^{1/2}]^{-1}$$

In the present embodiment of arc detection system 10, circuit interrupter 18 is preferably a circuit breaker having a tripping coil which operates the circuit breaker in response to a trip signal applied to conductor 46. Additionally, current sensor 20 is preferably located in the phase conductor. However, there may be applications wherein sensor 20 is connected in series with the neutral conductor 48 or the ground conductor 50. Additionally, the circuit shown in FIG. 1 is a single-phase circuit. However, for a multi-phase circuit, a current sensor 20 could be coupled in all of the phase conductors thereof.

As generally discussed above, arc detection system 10 is configured to detect line-to-line, line-to-ground, line-to-neutral, and contact arcing. By way of specific example, load 14 is connected to phase conductor 24, neutral conductor 48 and ground conductor 50 by terminals 52, 54 and 56, respectively. Thus, in the circuit of FIG. 1, the potential for arcing is between conductors 24 and 48, 24 and 50, within terminal 52, within terminal 54, within terminal 56, and within load 14. Current sensor 20 is configured to produce signals representative of current frequencies related to these types of arcing without introducing spurious signals. Thus, this reduces the risk that arc monitoring and response circuit 22 will apply spurious signals to conductor 46, thereby producing unwanted circuit interruption by circuit interrupter 18.

Figure 2:
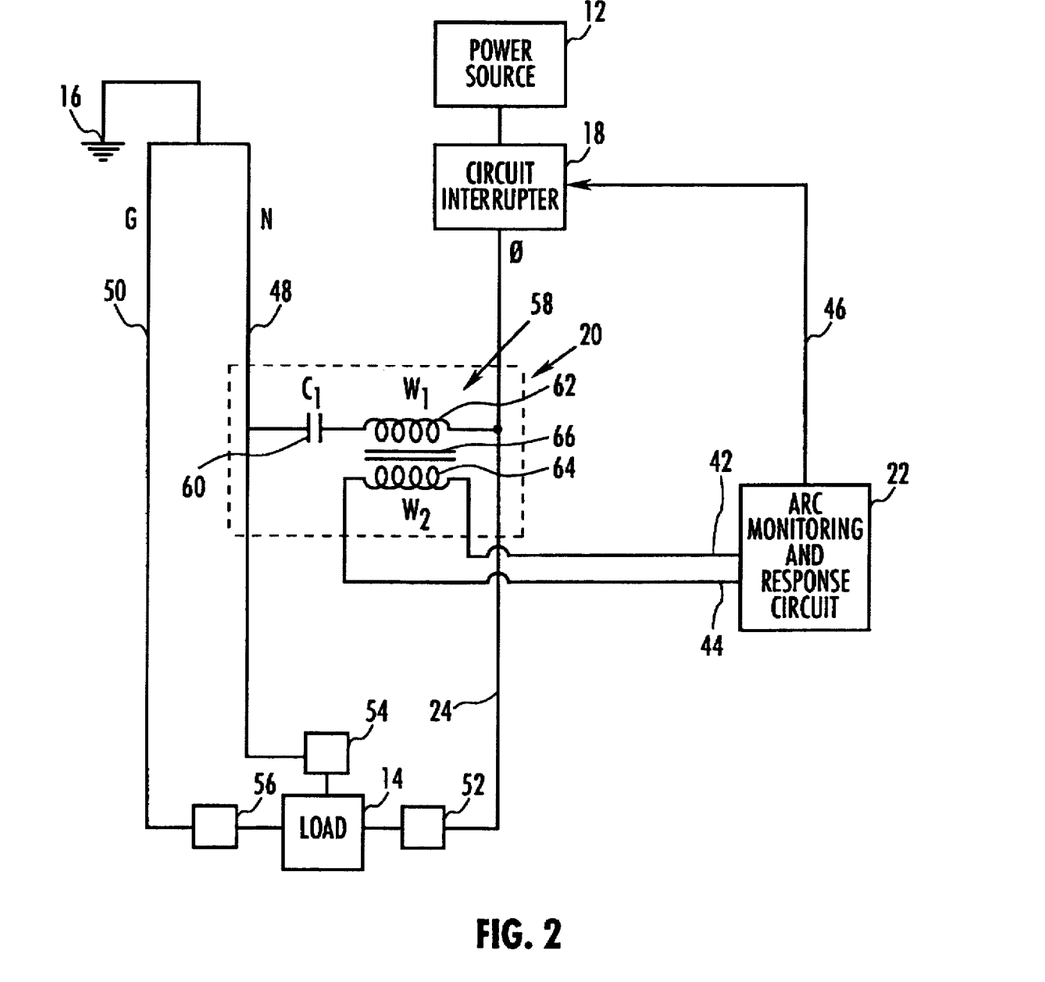
FIG. 2 is a schematic circuit diagram of a second embodiment of the arc detection system.

FIG. 2 illustrates a second embodiment of current sensor 20. In this embodiment, current sensor 20 is connected between conductor 24 and neutral conductor 48 or ground conductor 50. The second embodiment of current sensor 20 includes a transformer 58 and a capacitor 60. Transformer 58 includes a primary winding 62, a secondary winding 64, and a toroid core 66. Windings 62 and 64 are bifilar windings (i.e., wound as a pair of winding wires around core 66). Capacitor 60 and primary winding 58 are connected in series between phase conductor 24 and neutral conductor 48, as shown in FIG. 2.

Capacitor 60 and the inductance of winding 58 form a band-pass filter. Signals which may include components representative of arcing are coupled to secondary winding 64 to produce a voltage signal. By providing capacitor 60 a value of about 100 picofarads and winding 58 an inductance of about 1 microhenry, the transformer provides a center frequency between 16 and 17 MHz. In general, the embodiment of current sensor 20 illustrated in FIG. 2 permits system 10 to monitor arcing in an electric circuit based upon the voltage in the electric circuit, whereas the embodiment of current sensor 20 illustrated in FIG. 1 permits system 10 to monitor the electric circuit for arcing based upon current.

Depending upon the specific application, either one or both of these sensors may be used to provide an optimal system for monitoring arcing.

Figure 3:
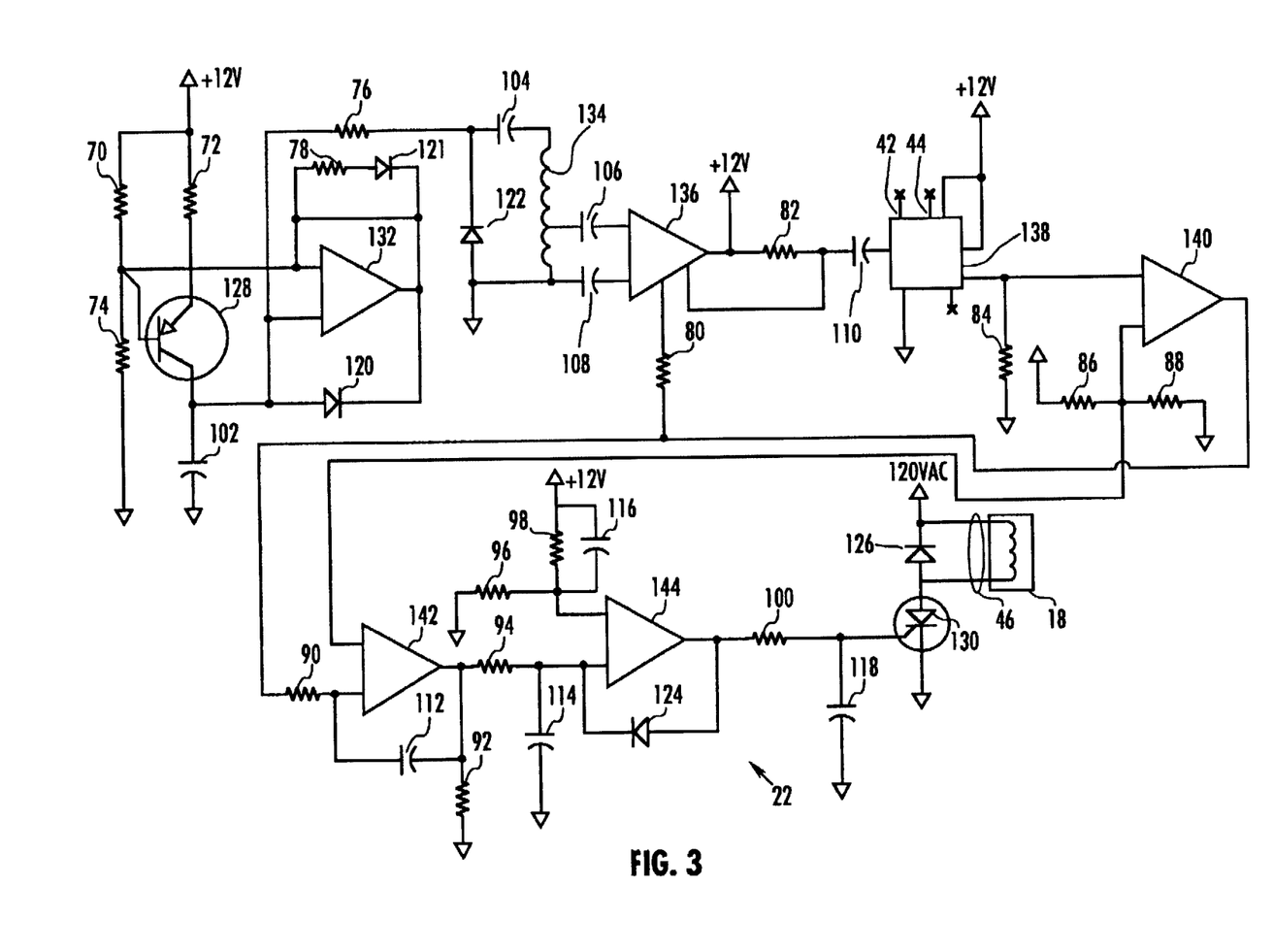
FIG. 3 is a circuit diagram for a first embodiment of an arc detection circuit.

Referring to FIG. 3, the first embodiment of arc monitoring and response circuit 22 includes resistors 70, 72, 74, 76, 78, 80, 82, 84, 86, 88, 90, 92, 94, 96, 98 and 100, capacitors 102, 104, 106, 108, 110, 112, 114, 116 and 118, diodes 120, 121, 122, 124 and 126, transistor 128, silicon controlled rectifier 130, comparator 132, winding 38 (or 58), radio frequency amplifier 136, low-level video detector 138, amplifier 140, amplifier 142, and amplifier 144 electrically connected as shown in FIG. 3. By way of example, the components of the second embodiment of circuit 22 may have the following characteristics:

| | |
|---|---|
| Resistor 70 | 15 K ohms |
| Resistor 72 | 49 K ohms |
| Resistor 74 | 100 K ohms |
| Resistor 76 | 220 K ohms |
| Resistor 78 | 100 ohms |
| Resistor 80 | 15 K ohms |
| Resistor 82 | 1 K ohms |
| Resistor 84 | 3.9 K ohms |
| Resistor 86 | 20 K ohms |
| Resistor 88 | 11.5 K ohms |
| Resistor 90 | 10 K ohms |
| Resistor 92 | 10 K ohms |
| Resistor 94 | 107 K ohms |
| Resistor 96 | 30.1 K ohms |
| Resistor 98 | 9.09 K ohms |
| Resistor 100 | 10 K ohms |
| Capacitor 102 | .068 µF |
| Capacitor 104 | 1000 pF |
| Capacitor 106 | 220 pF |
| Capacitor 108 | 220 pF |
| Capacitor 110 | 220 pF |
| Capacitor 112 | .0027 µF |
| Capacitor 114 | .1 µF |
| Capacitor 116 | .1 µF |
| Capacitor 118 | 1 µF |
| Diode 120 | 1N4148 |
| Diode 121 | 1N4148 |
| Diode 122 | BB112 |
| Diode 124 | 1N4148 |
| Diode 126 | 1N4004 |
| Transistor 128 | 2N3906 |
| Comparator 132 | LT1017 |
| Amplifier 136 | MC1350P |
| Detector 138 | MC1330AP |
| Inverter 140 | LT1017 |
| Amplifier 142 | LMC662 |
| Amplifier 144 | LMC662 |

Transistor 128, comparator 132, diode 122 and winding 38 provide signal filtering. This filtered signal is applied to amplifier 136. Detector 138 produces a signal representative of an inverted envelope of the signal (high frequency arcing signal) produced at capacitor 110. This inverted signal is applied to amplifier 140 which inverts the signal and applies the signal to amplifiers 142 and 144, which cooperate with the associated circuitry to amplify the signal to a level in the range of 3-12 V, and integrate the signal.

The amplified signal produced at the output of amplifier 142 is applied to an RC time delay including resistor 94 and capacitor 114. This time delay avoids the application of spurious triggering signals to SCR 130. When the voltage across capacitor 114 exceeds a predetermined triggering level, SCR 130 applies the 120 V AC signal to the tripping coil of circuit interrupter 18. Diode 124 latches the output integrating amplifier 144 during the positive and negative portions of the AC cycle of the current produced by power source 12. Accordingly, upon detection of an arc within phase conductor 24, the tripping coil of circuit interrupter 18 is energized, the contacts thereof are opened, and power from power source 12 is removed from load 14.

Figure 4A:
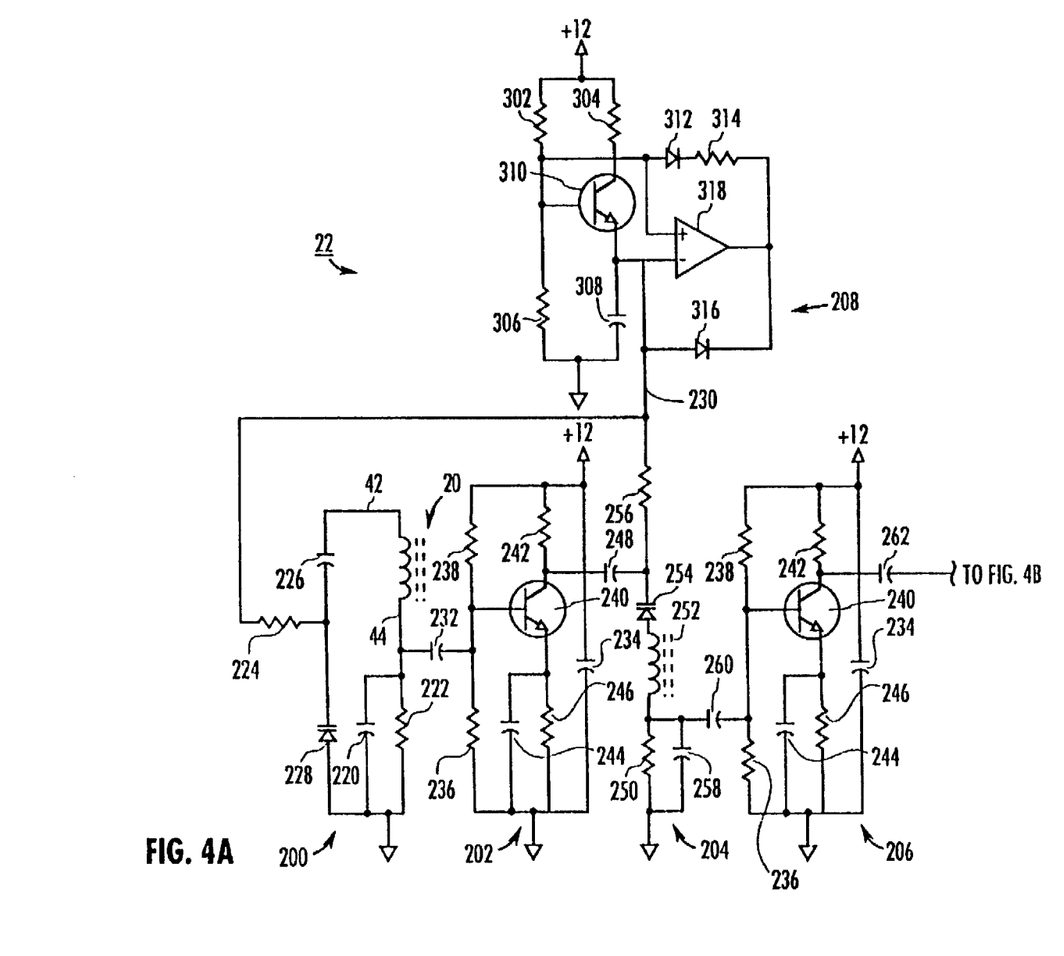
FIGS. 4A and 4B are a circuit diagram for a second embodiment of the arc detection circuit.
Figure 4B:
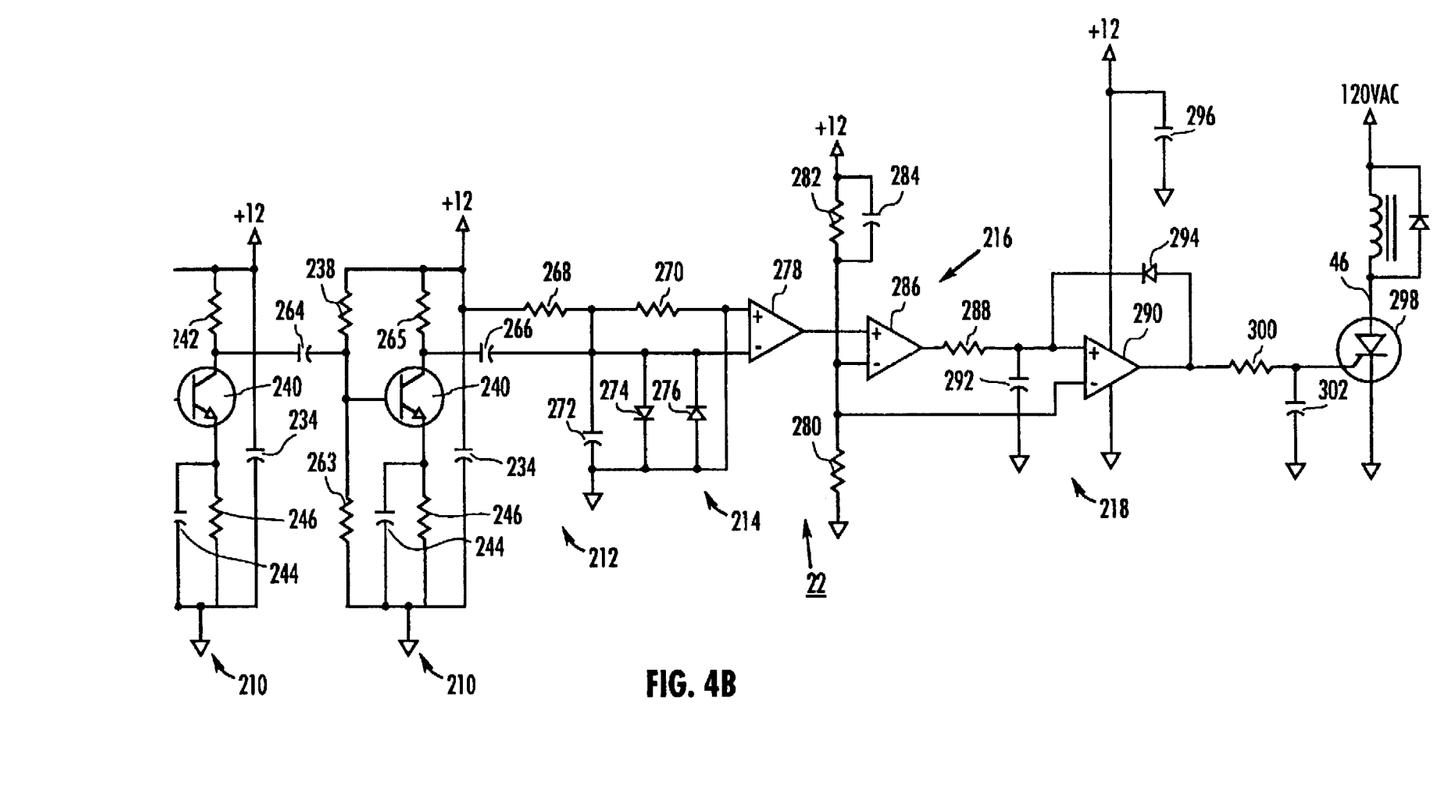

Referring to FIGS. 4A and 4B, the second embodiment of arc monitoring and response circuit 22 includes a variable frequency (swept) filter circuit 200, an amplifier circuit 202, a second variable frequency (swept) filter circuit 204, an amplifier circuit 206, a filter sweep signal generator circuit 208, an amplifier circuit 210, an amplifier circuit 212, a clipping and comparator circuit 214, a reference selector circuit 216, and an integration circuit 218. Variable frequency filter 200 includes a capacitor 220 and resistor 222 connected between ground and conductor 44, a resister 224, a capacitor 226 connected between conductor 42 and resistor 224, and a varactor 228 (i.e. variable capacitance diode) connected between resistor 224 and ground. Resistor 224 is also connected to output conductor 230 of filter sweep signal generator 208.

Variable frequency filter 200 is connected to amplifier 202 by a capacitor 232 which filters the DC components on signals produced by filter 200 before application of such signals to amplifier 202. Amplifier 202 is powered by the 12 V system supply and includes a capacitor 234 connected between the 12 V supply and ground, a resistor 236 connected between capacitor 232 and ground, a resistor 238 connected between capacitor 232 and the 12 V supply, and a transistor 240. The base of transistor 240 is connected to capacitor 232, the collector of transistor 240 is connected to the 12 V supply by a resistor 242, and the emitter of transistor 240 is connected to ground by the parallel connection of a capacitor 244 and a resistor 246.

A capacitor 248 connects the collector of transistor 240 to the second variable frequency filter 204. More specifically, filter 204 includes a resistor 250 connected between ground and an inductor 252, a varactor 254 having its anode connected to the inductor, and its cathode connected to capacitor 248, and a resistor 256 connected between the cathode of varactor 254 and conductor 230. Filter 204 also includes a capacitor 258 connected in parallel with resistor 250.

A capacitor 260 connects filter 204 to amplifier 206. As with capacitors 232 and 248, capacitor 260 filters out the DC components of the signal applied by filter 204 to amplifier 206. Referring specifically to FIGS. 4A and 4B, amplifiers 200, 206, 210 and 212 have substantially the same structure and components. Accordingly, the components of amplifiers 206, 210, and 212 are referenced with the same numbers as the components of amplifier 202. Amplifier 206 is connected to amplifier 210 with a capacitor 262, and amplifier 210 is connected to amplifier 212 with a capacitor 264. Capacitors 262 and 264 filter DC components which may be in the signals transmitted from amplifiers 206 to 210 and from amplifier 210 to 212, respectively. For purposes of appropriately tuning amplifier 212, amplifier 212 differs from amplifier 202 in that resistor 236 has been replaced with a resistor 262 having a different resistive value, and resistor 242 has been replaced with resistor 264 having a different resistive value than resistor 242.

A capacitor 266 and a resistor 268 connect amplifier 212 to clipping and comparator circuit 214. Circuit 214 includes a resistor 270, capacitor 272, diode 274, diode 276, and operational amplifier 278 connected together as shown in FIG. 4B.

The output of amplifier 278 is connected to the input of reference selector circuit 216. In particular, circuit 216 is coupled between ground and the 12 V reference by a resistor 280, a resistor 282, and a capacitor 284 connected in parallel with resistor 282. Circuit 216 also includes an comparator 286 having its non-inverting input connected to the output of amplifier 278, and its inverting input connected to ground by resistor 280.

The output of amplifier 286 is connected by a resistor 288 to integration circuit 218. Integration circuit 218 includes a comparator 290 having its non-inverting input connected to ground by capacitor 292, and connected to the output of amplifier 286 by resistor 288. The inverting input of comparator 290 is connected to ground by resistor 280. A diode 294 connects the output of comparator 290 to the non-inverting input thereof. Power is applied to comparator 290 by the 12 V voltage supply which is filtered in part by capacitor 296. The output of comparator 290 is also connected to an SCR 298 by a resistor 300. A capacitor 302 connects SCR 298 to ground as shown. The anode of SCR 298 is connected to the tripping solenoid of circuit interrupter 18 by conductor 46. The cathode of SCR 298 is connected to ground.

Referring again to FIG. 4A, filter sweep signal generator 208 includes a resistor 302, a resistor 304, a resistor 306, a capacitor 308, a transistor 310, a diode 312, a resistor 314, a diode 316, and an operational amplifier 318 connected to conductor 230, ground and the 12 V supply as shown in FIG. 4A. This configuration of generator circuit 208 produces a voltage on conductor 230 which is basically a saw-tooth wave which cycles from 0.5 to 10 volts at a rate of approximately 180 Hz. This 180 Hz signal is applied to filter circuits 200 and 204 to control varactors 228 and 254 which vary the center frequencies of these filters from between 2 and 8 MHz to 12 to 18 MHz. Preferably, filter circuits 200 and 204 are configured to have center frequencies which cycle between 5 and 15 MHz at a rate of 180 Hz which corresponds to the sweep signal or modified sawtooth (i.e. charge capacitor 308 at a given rate over about $\frac{1}{180}$ sec and then immediately discharge capacitor 308) wave produced on conductor 230 by generator 208.

In general, filters 200 and 204 operate to filter or transform the signal produced by sensor 20 into a signal which has amplitudes which represent the potential of the current in conductor 24. Filter 204 is not absolutely essential, however, the signal produced by sensor 20 is filtered at frequencies ranging from about 5 to 15 MHz which increment (i.e. increase or decrease) at a constant rate over the cycle time (i.e., $\frac{1}{180}$ seconds) of the sweep signal at conductor 230. However, due to propagation delays of the signal produced by sensor 20 through filter 200 and amplifier 202, filter 204 filters the signal at a time which is delayed from the time at which filter 200 filters the signal. Accordingly, filters 200 and 204 in effect operate as a compound filter to narrow the band width about which the signal produced by sensor 20 is filtered. Byway of specific example, the band width of filters 200 and 204 individually is approximately 2 MHz, and this band width can be narrowed to approximately 1 MHz by combining filters 200 and 204 as shown in FIG. 4A.

Figure 5:
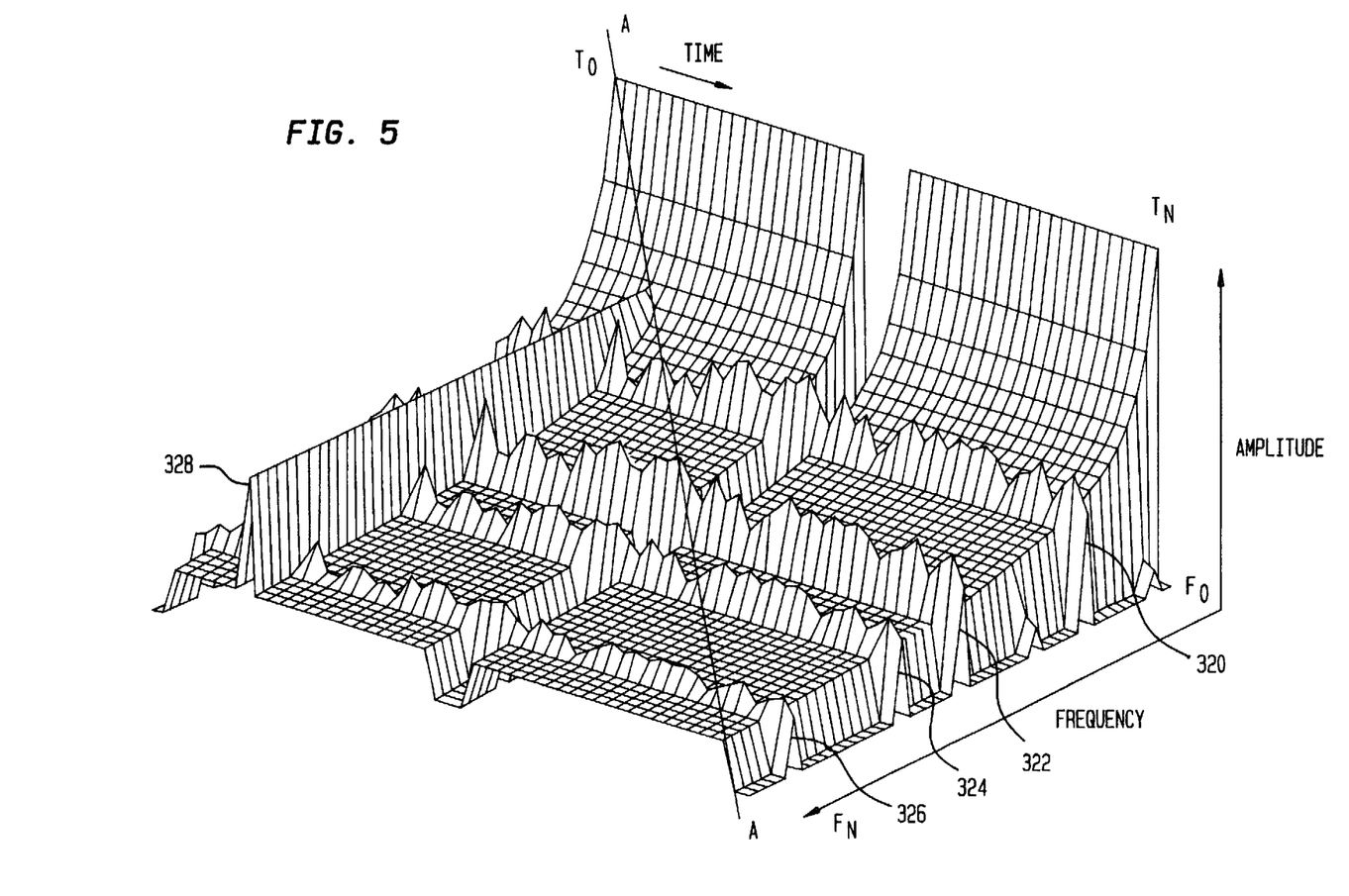
FIG. 5 is a three-dimensional graph representative of electric arcing, a multi-frequency signal (i.e. white noise) and time-continuous, narrow-band signals.

Referring to FIG. 5, a three-dimensional graph of the signal produced by an arc on conductor 24 is shown. In particular, the graph includes frequency, amplitude, and time on the axes. The graph includes various features such as ridges 320, 322, 324 and 326 which represent narrow-band signals such as radio stations. The graph also includes a relatively continuous formation 328 extending along an axis generally parallel with the frequency axis and of relatively short duration in time. This formation 328 is representative of white noise which theoretically has equal amplitude in all of the frequencies over which it is present. The remainder of the amplitudes shown in FIG. 5 are a result of arcing energy. The arc which is represented by the graph in FIG. 5 extends over the full range of frequency shown, and has a duration for the full time period T0 to $T_N$. The arc detector shown in FIGS. 4A and 4B is configured to produce a trip signal in the presence of a signal which has amplitudes in a large range of frequencies, and a duration exceeding a predetermined limit (i.e., arcing).

Referring again to FIGS. 4A and 4B, when a signal including arcing such as that represented graphically in FIG. 5, is applied to filter 200, filter 200 outputs a signal having the amplitudes which fall along line A—A, and correspond to the frequencies from F0 to FN. The effect of using the variable frequency filter 200 is to produce a signal at the output thereof which includes relatively minimal amplitude information relating to the narrow-band signals 320, 322, 324 and 326, and the white noise 328. Accordingly, the production of spurious trip signals at SCR 298 is substantially reduced by using a variable frequency filter such as filter 200.

Amplifier 202 has a gain between 100 to 400 throughout the frequency spectrum of the signal produced at the output of capacitor 232, and amplifies the signal for application to the second variable frequency filter 204. As briefly discussed above, filter 204 operates substantially the same as filter 200, and filters the signal at a slight center frequency shift from filter 200. The combination of filters 200 and 204 filters the signal to provide a narrower band width for the center frequencies at which the signal is filtered. As discussed above, the band width for the center frequencies at which the signal is filtered is reduced by almost 50% by the use of the second variable frequency filter 204. However, depending upon the application and cost considerations, filter 204 could be eliminated.

Amplifiers 206, 210 and 212 each have a gain of approximately 100 to 400 across the frequency range of the signal produced at the output of capacitor 260. Amplification by amplifiers 206, 210 and 212 produce a signal at the output of capacitor 266 which can be clipped at 0.6 V by clipping circuit 214.

When the signal produced at the output of capacitor 266 is the result of a signal applied to sensor 20 which includes arcing, the output of operational amplifier 278 remains high relative to the inverting input reference voltage (e.g. approximately 8 V) of operational amplifier 286. As a result, the output of amplifier 286 is driven high and charges capacitor 292. When the output of amplifier 286 is low, capacitor 292 is discharged through amplifier 286. Accordingly, capacitor 292, in cooperation with the associated circuitry, operates as an integrator to integrate the signal produced by amplifier 278 which is above the threshold voltage set by the voltage reference at the inverting input of amplifier 286. Accordingly, when arcing is present, and the output of amplifier 286 remains high, capacitor 292 charges and when the voltage across capacitor 292 exceeds a predetermined limit as set by the resistor bridge 282 and 280 and the 12 V supply (e.g., approximately 8 V), comparator 290 outputs a logic high tripping signal to resistor 300 which forward biases SCR 298 which in turn activates the trip solenoid of the circuit interrupter to open conductor 24 and remove load 14 from power source 12.

Diode 294 is a latching diode which latches the output of comparator 290 high when a trip signal is produced on the output thereof. The purpose of this latching arrangement is to ensure that SCR 298 remains forward biased even though SCR 298 may be controlling the application of an alternating current to the tripping solenoid of the circuit interrupter. More specifically, without this arrangement, the alternating current would reverse bias SCR 298 and SCR 298 would discontinue current conduction in the event arcing terminated. Typically, once arcing is detected by the circuit, tripping should occur even when arcing may have terminated. This is important because circuit interrupter 18 should be opened upon detection of arcing regardless of whether or not arcing terminates before the solenoid is energized to open circuit interrupter 18. Upon the opening of circuit interrupter 18, the 12 V power supply is discontinued, and the capacitors in the circuitry of the arc detector discharge, and the latching of comparator 290 is discontinued.

By way of example, the components of the third embodiment of circuit 22 may have the following characteristics:

| | |
|---|---|
| Capacitor 220 | 250 pF |
| Resistor 222 | 49.9 ohms |
| Resistor 224 | 100 K ohms |
| Capacitor 226 | 250 pF |
| Capacitor 232 | 1 nF |
| Capacitor 234 | 100 μF |
| Resistor 236 | 10 K ohms |
| Resistor 238 | 100 K ohms |
| Transistor 240 | 2N3904 |
| Resistor 242 | 10 K ohms |
| Capacitor 244 | 1 nF |
| Resistor 246 | 470 ohms |
| Capacitor 248 | 1 nF |
| Resistor 250 | 49.9 ohms |
| Inductor 252 | 1.5 μH |
| Resistor 256 | 100 K ohms |
| Capacitor 258 | 1n F |
| Capacitor 260 | 1n F |
| Capacitor 262 | 1n F |
| Resistor 263 | 51.1 K ohms |
| Capacitor 264 | 1n F |
| Resistor 265 | 3.3K ohms |
| Capacitor 266 | 1n F |
| Resistor 268 | 1 M ohms |
| Resistor 270 | 10 K ohms |
| Capacitor 272 | 15 pF |
| Diode 274 | 1N4148 |
| Diode 276 | 1N4148 |
| Amplifier 276 | LM2902 |
| Resistor 280 | 22.6 K ohms |
| Resistor 282 | 7.5 K ohms |
| Capacitor 284 | 100 nF |
| Comparator 286 | LM2902 |
| Resistor 288 | 107 K ohms |
| Comparator 290 | LM2902 |
| Capacitor 292 | 100nF |
| Diode 294 | 1N4148 |
| Capacitor 296 | 100nF |
| SCR 298 | EC103D |
| Resistor 300 | 1 K ohms |
| Capacitor 302 | 100nF |

The second embodiment of the arc detector has been described in detail in reference to the analog circuitry of FIGS. 4A and 4B. Presently, it is believed that this is the most cost effective way to implement the arc detector. However, this arc detector can be implemented in a programmed digital processor with associated analog-to-digital circuitry and digital inputs and outputs (e.g., microcontroller). More specifically, sensor 20 would be coupled to the analog-to-digital converter of the controller with appropriate filtering, and the controller would be programmed (configured) to provide digital filtering of the digital signal produced by the analog-to-digital converter. This digitally filtered signal would then be analyzed by appropriate software to produce digital data representative of a trip signal when the signal produced by sensor 20 represents an arc in conductor 24. In other words, the digital filtering and data manipulation which would occur in the microcontroller would be configured to produce a trip signal in response to an arcing signal in substantially the same manner as that produced by the analog circuitry of FIGS. 4A and 4B. SCR 298 would be coupled to a digital output of the microcontroller by appropriate isolation circuitry as necessary and, upon generation of a trip signal by the microcontroller in response to arcing, the digital output would forward bias SCR 298 to trip the circuit breaker. Accordingly, given the circuitry shown in FIGS. 4A and 4B, substitution of this circuitry with an appropriately configured microcontroller is possible and would be likely in the event that the costs of microcontrollers capable of handling the signal processing required to implement the arc detector are reduced in the future.

Figure 6:
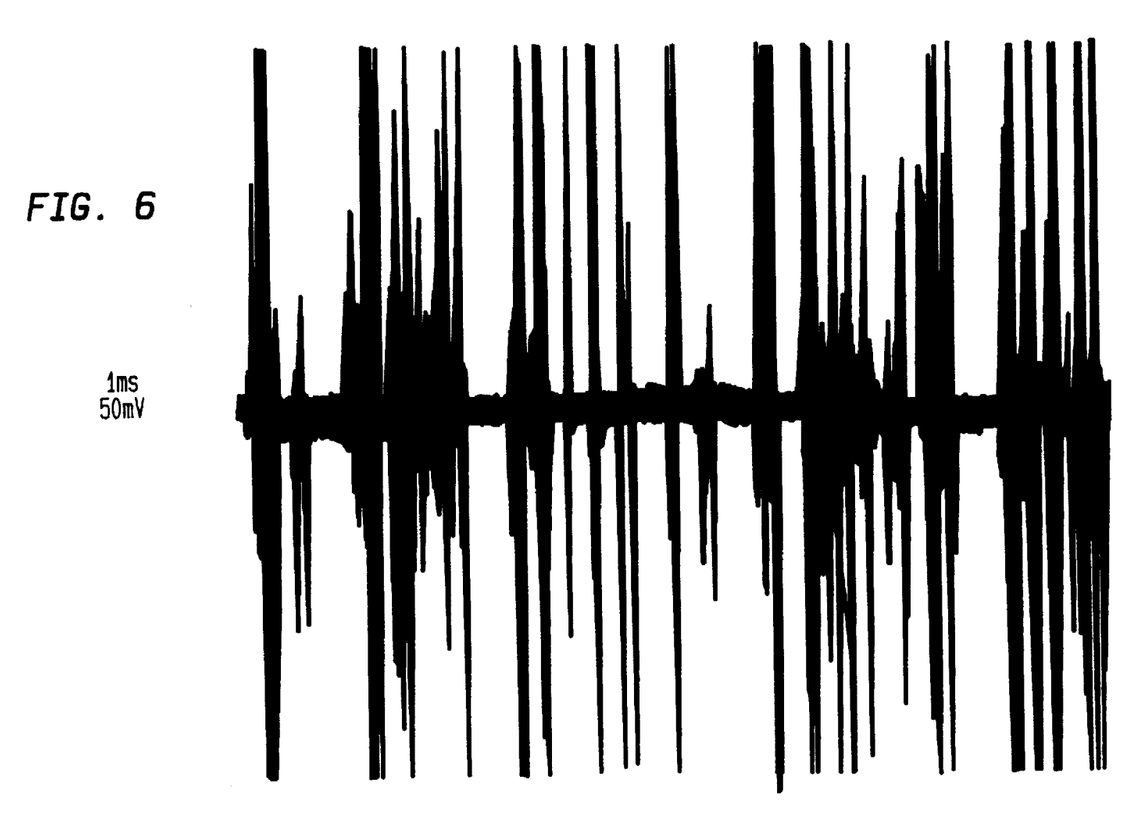
FIG. 6 is a graph of the noise of a drill motor filtered by the second embodiment of the arc detection circuit.
Figure 7:
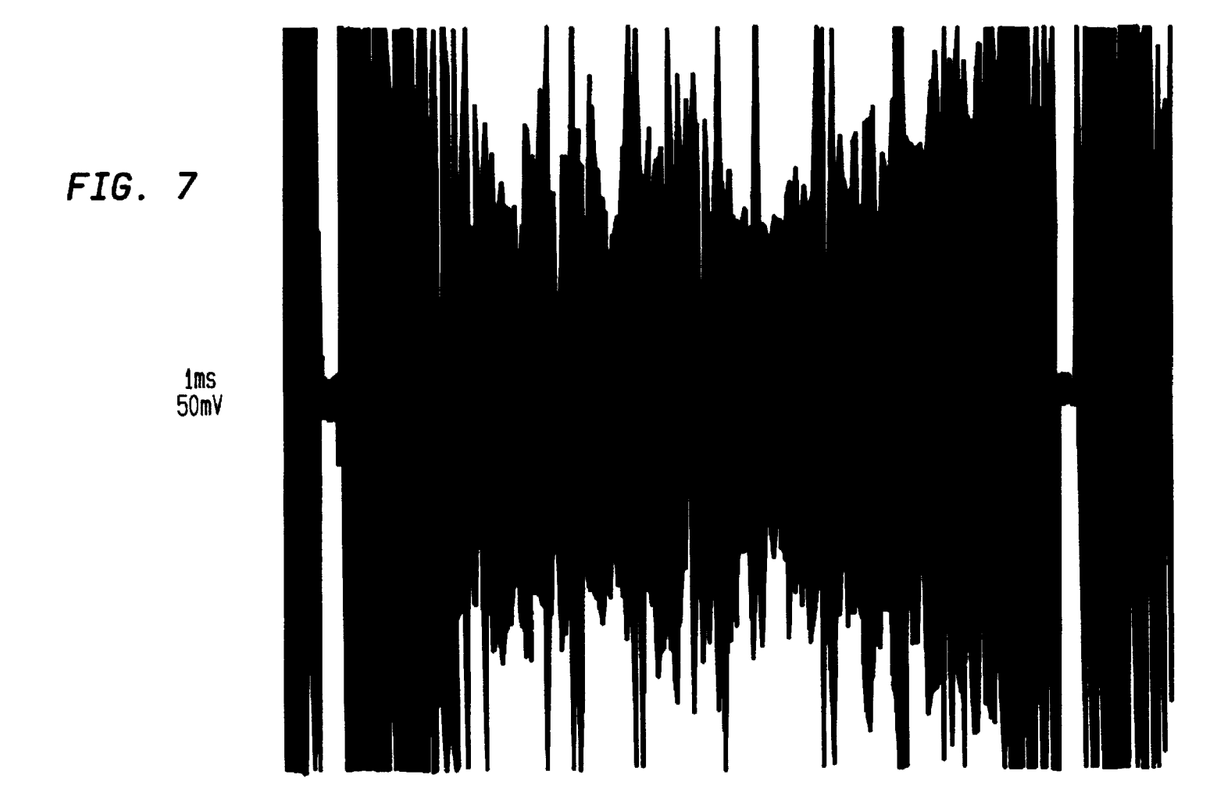
FIG. 7 is a graph of the noise produced by a drill motor in the presence of arcing filtered by the second embodiment of the arc detection circuit.

Turning now to a specific situation wherein it is desirable to avoid spurious tripping as a result of failing to accurately determine the presence of arcing, FIGS. 6 and 7 illustrate signals representative of those produced at capacitor 266. FIG. 6 illustrates the signal produced when an electric drill is connected as load 14. It is generally known that electric drills produce substantial noise in the circuitry to which they are attached. However, an arc detector should not produce a trip signal in response to the noise produced thereby. FIG. 7 illustrates a signal produced at capacitor 266 which includes both the presence of a drill and arcing. As can be readily appreciated, the filtered signal shown in FIG. 7 has amplitudes which are relatively high at the range of frequencies for which filters 200 and 204 sweep. Accordingly, when the signal shown in FIG. 6 is applied to comparator 206, the output 8 goes high and low in such a manner that capacitor 292 does not have a chance to charge (i.e. integrate) and thus produce a tripping signal at the output of comparator 290. However, the signal shown in FIG. 7 will maintain the output 8 high substantially constantly, and cause capacitor 292 to charge (i.e. integrate) to a voltage which causes comparator 290 to produce a trip signal at the output thereof.

The preferred embodiment of the present invention has been disclosed by way of example and it will be understood that other modifications may occur to those skilled in the art without departing from the scope and spirit of the appended claims. For example, the values of the capacitances and inductances may be varied to accommodate primary frequencies other than 60 Hz (e.g., 50 Hz for European applications). Additionally, the core configuration of transformers 40 and 66 may also be modified to accommodate different applications. By way of further modification, the circuit of FIG. 2 may be modified by using 5.5 microhenry primary winding 62. Byway of further modification, current sensor 20, when used with the monitoring and response circuit 22, may take the form of a current transformer magnetically coupled to one or more of conductors 24, 48 or 50.

What is claimed is:

1. An arc detector for producing an arc signal in response to an arc produced by the current in an electric conductor, the detector comprising:

a sensor coupled to the electrical conductor to produce a first signal representative of the current in the conductor, wherein the current has a plurality of frequencies;

a transform circuit coupled to the sensor to produce a second signal having amplitudes which represent the current at the plurality of frequencies; and a monitoring circuit coupled to the transform circuit to monitor the amplitudes of the second signal corresponding to a range of the plurality of frequencies, and generating the arc signal when the amplitudes of the range correspond to an predetermined amplitude condition, wherein the transform circuit comprises a first variable frequency filter which has a first center frequency which changes from a first frequency to a second frequency, the plurality of frequencies being between the first and second frequencies, and the first variable frequency filter being coupled to the sensor to produce the second signal having amplitudes which represent the current at the plurality of frequencies.

2. The arc detector of claim 1, wherein the sensor is a current transformer.

3. The arc detector of claim 1, wherein the sensor is a current shunt.

4. The arc detector of claim 1, wherein the monitoring circuit comprises:

an amplifying circuit coupled to the transform circuit to amplify the second signal to produce a third signal;

an integration circuit coupled to the amplifier to integrate the third signal when the amplitude of the third signal exceeds a limit to produce an integration signal; and a comparator circuit coupled to the integration circuit to output the arc signal when the integration signal exceeds the limit.

5. The arc detector of claim 1, wherein the center frequency of the first variable frequency filter cycles between the first and second frequencies at a constant rate over a first time period.

6. The arc detector of claim 5, wherein the first frequency is in the range of 2 to 8 megahertz and the second frequency is in the range of 12 to 18 megahertz.

7. The arc detector of claim 1, wherein the transform circuit comprises a second variable frequency filter which has a second center frequency which changes from the first frequency to the second frequency, the plurality of frequencies being between the first and second frequencies, and the second variable frequency filter being coupled to the first variable frequency filter to further filter the second signal.

8. The arc detector of claim 7, wherein the center frequency of the second variable frequency filter is offset from the center frequency of the first variable frequency filter.

9. The arc detector of claim 8, further comprising a first amplifying circuit coupled between the variable frequency filters.

10. The arc detector of claim 9, wherein the monitoring circuit comprises:

a second amplifying circuit coupled to the second variable frequency filter to amplify the second signal to produce a third signal;

an integration circuit coupled to the second amplifier to integrate the third signal when the amplitude of the third signal exceeds a limit to produce an integration signal; and a comparator circuit coupled to the integration circuit to output the arc signal when the integration signal exceeds the limit.

11. An arc detection circuit coupled to an electric conductor and generating an arc signal in response to a current within the conductor generated in response to an electric arc, the circuit comprising:

a transducer coupled to the electric conductor to generate a first signal representative of the current within the conductor;

a variable frequency filter circuit having a filter frequency which changes in response to a control signal, the filter being coupled to the output to generate a second signal having a plurality of amplitudes representative of the current at a respective plurality of frequencies; and a threshold sensing circuit coupled to the variable frequency filter circuit to generate the arc signal when a plurality of the amplitudes representative of the currents at the respective plurality of frequencies within a range exceed at least one threshold amplitude.

12. The arc detector of claim 11, wherein the transducer is a current transformer.

13. The arc detector of claim 11, wherein the transducer is a current shunt.

14. The arc detector of claim 11, wherein the variable frequency filter circuit comprises first and second variable frequency filters which have a center frequency which changes from a first frequency to a second frequency, the plurality of frequencies being between the first and second frequencies, the first variable frequency filter being coupled to the sensor, and the second variable frequency filter is coupled to the first variable frequency filter to produce the second signal.

15. The arc detector of claim 14, wherein the center frequency cycles between the first and second frequencies at a constant rate over a first time period.

16. The arc detector of claim 15, wherein the first frequency is in the range of 2 to 8 megahertz and the second frequency is in the range of 12 to 18 megahertz.

17. The arc detector of claim 15, further comprising a first amplifying circuit coupled between the variable frequency filters.

18. The arc detector of claim 17, wherein the threshold sensing circuit comprises:
   a second amplifying circuit coupled to the second variable frequency filter to amplify the second signal to produce a third signal;
   an integration circuit coupled to the second amplifier to integrate the third signal when the amplitude of the third signal exceeds a limit to produce an integration signal; and
   a comparator circuit coupled to the integration circuit to output the arc signal when the integration signal exceeds the limit.

19. An arc detector comprising:
   generating means for generating a first signal representative of an electric arc in an electrical conductor;
   filtering means for filtering the first signal at a plurality of frequencies to generate a second signal;
   monitoring means for monitoring the second signal to generate a third signal representative of the amplitude of the second signal within a range of the plurality of frequencies; and
   detection means for generating an arc detection signal when the third signal is representative of arcing within the electrical conductor,
   wherein the filtering means comprises a first variable frequency filter which has a first center frequency which changes from a first frequency to a second frequency, the plurality of frequencies being between the first and second frequencies, and the first variable frequency filter being coupled to the generating means to produce the second signal having amplitudes which represent the current at the plurality of frequencies.

20. The arc detector of claim 19, wherein the generating means is a current transformer.

21. The arc detector of claim 19, wherein the generating means is a current shunt.

22. The arc detector of claim 19, wherein the center frequency of the first variable frequency filter cycles between the first and second frequencies at a constant rate over a first time period.

23. The arc detector of claim 22, wherein the first frequency is in the range of 2 to 8 megahertz and the second frequency is in the range of 12 to 18 megahertz.

24. The arc detector of claim 22, wherein the monitoring means comprises:
   an amplifying circuit coupled to the first variable frequency filter to amplify the second signal to produce the third signal; and
   an integration circuit coupled to the amplifier to integrate the third signal when the amplitude of the third signal exceeds a limit to produce an integration signal.

25. The arc detector of claim 24, wherein the detector means comprises a comparator circuit coupled to the integration circuit to output the arc detection signal when the integration signal exceeds the limit.

26. The arc detector of claim 19, wherein the filtering means further comprises a second variable frequency filter which has a second center frequency which changes from the first frequency to the second predetermined frequency, the plurality of frequencies being between the first and second frequencies, and the second variable frequency filter being coupled to the first variable frequency filter to further filter the second signal.

27. The arc detector of claim 26, wherein the center frequency of the second variable frequency filter is offset from the center frequency of the first variable frequency filter.

28. The arc detector of claim 27, further comprising a first amplifying circuit coupled between the variable frequency filters.

29. The arc detector of claim 28, wherein the monitoring means comprises:
   a second amplifying circuit coupled to the second variable frequency filter to amplify the second signal to produce the third signal; and
   an integration circuit coupled to the second amplifier to integrate the third signal when the amplitude of the third signal exceeds a limit to produce an integration signal.

30. The arc detector of claim 29, wherein the detector means comprises a comparator circuit coupled to the integration circuit to output the arc detection signal when the integration signal exceeds the limit.

31. A circuit interrupter for interrupting the flow of current within at least one electrical conductor in response to arcing produced by current flow in the electrical conductor, the interrupter comprising:
   a switching device coupled to the electrical conductor and operable to open the circuit defined by the electrical conductor in response to a trip signal;
   a transducer coupled to the electrical conductor to generate a first signal representative of the electric current in the electrical conductor;
   a variable frequency filter coupled to the transducer to generate a second signal representative of the first signal at a plurality of frequencies within a first range;
   a monitoring circuit coupled to the variable frequency filter to generate a third signal representative of the power of a portion of the second signal, wherein the portion is generated from a second range of the plurality of frequencies in the first range; and
   a trip circuit coupled to the switching device and the monitoring circuit to apply a trip signal to the switching device when the third signal is representative of an energy level of the portion of the second signal representative of arcing in the electrical conductor.

32. The circuit interrupter of claim 31, wherein the transducer is a current transformer.

33. The circuit interrupter of claim 31, wherein the transducer is a current shunt.

34. The circuit interrupter of claim 31, wherein the switching device is a circuit breaker including tripping coil coupled to the trip circuit.

35. The circuit interrupter of claim 34, wherein the variable frequency filter circuit comprises first and second variable frequency filters which have a center frequency which changes from a first frequency to a second frequency, the plurality of frequencies being between the first and second frequencies, the first variable frequency filter being coupled to the sensor, and the second variable frequency filter is coupled to the first variable frequency filter to produce the second signal.

36. The circuit interrupter of claim 35, wherein the center frequency cycles between the first and second frequencies at a constant rate over a first time period.

37. The circuit interrupter of claim 36, wherein the first frequency is in the range of 2 to 8 megahertz and the second frequency is in the range of 12 to 18 megahertz.

38. The circuit interrupter of claim 36, further comprising a first amplifying circuit coupled between the variable frequency filters.

39. The circuit interrupter of claim 38, wherein the trip circuit comprises:

a second amplifying circuit coupled to the second variable frequency filter to amplify the second signal to produce the third signal;

an integration circuit coupled to the second amplifier to integrate the third signal when the amplitude of the third signal exceeds a limit to produce an integration signal; and a comparator circuit coupled to the integration circuit to apply the trip signal to the tripping coil when the integration signal exceeds the limit.

40. A circuit interrupter comprising:

switching means for opening a circuit including an electrical conductor in response to a trip signal;

sensing means for generating a first signal representative of electric current in the electrical conductor;

filtering means for generating a second signal representative of the first signal filtered at a plurality of frequencies in a first range;

monitoring means for generating a third signal representative of the power of a portion of the second signal, wherein the portion is generated from a second range of the plurality of frequencies in the first range; and trip means for applying a trip signal to the switching means when the third signal is representative of an energy level of the portion of the second signal representative of arcing in the electrical conductor, wherein the filtering means comprises a first variable frequency filter which has a first center frequency which changes from a first frequency to a second frequency, the plurality of frequencies being between the first and second frequencies, and the first variable frequency filter being coupled to the generating means to produce the second signal having amplitudes which represent the current at the plurality of frequencies.

41. The circuit interrupter of claim 40, wherein the generating means is a current transformer.

42. The circuit interrupter of claim 40, wherein the generating means is a current shunt.

43. The circuit interrupter of claim 42, wherein the center frequency of the first variable frequency filter cycles between the first and second frequencies at a constant rate over a first time period.

44. The circuit interrupter of claim 43, wherein the first frequency is in the range of 2 to 8 megahertz and the second frequency is in the range of 12 to 18 megahertz.

45. The circuit interrupter of claim 44, wherein the monitoring means comprises:

an amplifying circuit coupled to the first variable frequency filter to amplify the second signal to produce the third signal; and an integration circuit coupled to the amplifier to integrate the third signal when the amplitude of the third signal exceeds a limit to produce an integration signal.

46. The circuit interrupter of claim 45, wherein the filtering means further comprises a second variable frequency filter which has a second center frequency which changes from the first frequency to the second frequency, the plurality of frequencies being between the first and second frequencies, and the second variable frequency filter being coupled to the first variable frequency filter to further filter the second signal.

47. The circuit interrupter of claim 46, further comprising a first amplifying circuit coupled between the variable frequency filters.

48. The circuit interrupter of claim 47, wherein the detector means comprises a comparator circuit coupled to the integration circuit to output the trip signal when the integration signal exceeds the limit.

49. The circuit interrupter of claim 44, wherein the trip means comprises a comparator circuit coupled to the integration circuit to output the trip signal when the integration signal exceeds the limit.

50. The circuit interrupter of claim 49, wherein the center frequency of the second variable frequency filter is offset from the center frequency of the first variable frequency filter.

51. The circuit interrupter of claim 50, wherein the monitoring means comprises:

a second amplifying circuit coupled to the second variable frequency filter to amplify the second signal to produce a third signal; and an integration circuit coupled to the second amplifier to integrate the third signal when the amplitude of the third signal exceeds a limit to produce an integration signal.

52. An electric arc detection method comprising the steps of:

generating a first signal representative of an electric current in an electrical conductor;

filtering the first signal at a plurality of frequencies to generate a second signal; and monitoring the second signal to generate a third signal representative of the power of the second signal within a range of the plurality of frequencies, wherein the step of filtering further comprises the step of cycling between the first and second frequencies at a constant rate over a first time period.

53. The method of claim 48, where in the step of filtering further includes the step of producing the second signal having amplitudes which represent the current at the plurality of frequencies.

54. The method of claim 53, wherein the step of monitoring further comprises the steps of:

amplifying the second signal to produce the third signal; and integrating the third signal when the amplitude of the third signal exceeds a limit to produce an integration signal.

55. The method of claim 52, wherein the step of generating further comprises the step of outputting the arc detection signal when the integration signal exceeds the limit.

* * * * *